US005769272A

United States Patent [19]

Massena

[11] Patent Number: 5,769,272

[45] Date of Patent: Jun. 23, 1998

[54] REMOVABLE CARTRIDGES FOR A GLUE GUN SYSTEM

[76] Inventor: Leo Massena, 6635 E. Lovers La., Dallas, Tex. 75214

[21] Appl. No.: 723,190

[22] Filed: Sep. 27, 1996

Related U.S. Application Data

[63] Continuation of Ser. No. 377,842, Jan. 25, 1995, Pat. No. 5,664,701.

[51] Int. Cl.[6] .......... G01F 11/00

[52] U.S. Cl. .......... 222/1; 219/227; 219/421; 222/146.5; 222/190; 222/325; 392/480

[58] Field of Search .......... 222/1, 146.5, 190, 222/325; 219/227, 424; 392/480

[56] References Cited

U.S. PATENT DOCUMENTS

| | | | |
|---|---|---|---|
| 1,237,862 | 8/1917 | Bintliff . | |
| 1,409,616 | 3/1922 | Taddeo . | |
| 1,449,517 | 3/1923 | Lame . | |
| 1,769,437 | 7/1930 | Kromer . | |
| 2,117,179 | 5/1938 | Kopp | 18/12 |
| 2,255,578 | 9/1941 | Baker | 13/6 |
| 2,556,609 | 6/1951 | Arkless | 154/42 |
| 2,773,496 | 12/1956 | Czarnecki | 126/343.5 |
| 2,871,333 | 1/1959 | Savage | 219/27 |
| 3,032,635 | 5/1962 | Kraft | 219/19 |
| 3,109,045 | 10/1963 | Silverman | 13/6 |
| 3,154,811 | 11/1964 | Gardener | 18/12 |
| 3,199,740 | 8/1965 | Juffa et al. | 222/146 |
| 3,204,828 | 9/1965 | Paulsen | 222/146 |
| 3,228,566 | 1/1966 | Knox | 222/146 |
| 3,314,573 | 4/1967 | Newton | 222/146 |
| 3,430,816 | 3/1969 | Nadherny et al. | 222/146 |
| 3,443,059 | 5/1969 | Spencer | 219/233 |
| 3,459,335 | 8/1969 | Cohen et al. | 222/146 |
| 3,466,752 | 9/1969 | Braun | 32/60 |
| 3,485,417 | 12/1969 | Cocks | 222/146 |
| 3,522,413 | 8/1970 | Chrow | 219/301 |
| 3,560,703 | 2/1971 | Chedister | 219/222 |
| 3,744,921 | 7/1973 | Weller et al. | 401/2 |
| 3,896,973 | 7/1975 | Morgan | 222/146 |
| 4,065,034 | 12/1977 | Callan | 222/146 |
| 4,067,481 | 1/1978 | Feldman | 222/146 |
| 4,103,145 | 7/1978 | Oliveri | 219/222 |
| 4,320,857 | 3/1982 | Herb et al. | 222/146 |
| 4,334,142 | 6/1982 | Blackmore | 219/301 |
| 4,463,877 | 8/1984 | Siwon | 222/146 |
| 4,601,597 | 7/1986 | Bertram et al. | 401/1 |
| 4,639,155 | 1/1987 | Schuster et al. | 401/1 |
| 4,692,587 | 9/1987 | Spirk, Jr. et al. | 219/242 |
| 4,776,490 | 10/1988 | Wingert | 222/146.5 |
| 4,781,482 | 11/1988 | Ursprung | 401/1 |
| 4,926,029 | 5/1990 | Pearson | 219/421 |
| 4,933,192 | 6/1990 | Darling et al. | 426/98 |
| 4,938,388 | 7/1990 | Yeh | 222/146.5 |
| 5,026,187 | 6/1991 | Belanger et al. | 401/1 |
| 5,236,269 | 8/1993 | Handy | 401/1 |
| 5,240,141 | 8/1993 | Blette | 222/95 |
| 5,324,305 | 6/1994 | Kanner | 606/213 |
| 5,362,164 | 11/1994 | Wingert | 401/2 |
| 5,375,766 | 12/1994 | Sweeney | 239/133 |

FOREIGN PATENT DOCUMENTS

| | | |
|---|---|---|
| 729.851 | 1/1932 | France . |
| 914405 | 9/1945 | France . |
| 41 11 248 A1 | 10/1992 | Germany . |
| 2 0909 921 | 7/1982 | United Kingdom . |

*Primary Examiner*—Joseph Kaufman

*Attorney, Agent, or Firm*—Gregory M. Howison; Mark W. Handley

[57] ABSTRACT

The glue gun system includes a gun having a barrel. A cartridge can be removably placed in the barrel. The cartridge has an open central passage to accept a glue stick and a tip to dispense the glue. Once received into the barrel the cartridge is heated, melting the glue therein. Additional cartridges can be maintained in a heated state by a heating stand. Thus, after one glue stick is used, a second can be immediately installed and used. An insulated tab allows for the easy handling of the cartridges.

21 Claims, 3 Drawing Sheets

REMOVABLE CARTRIDGES FOR A GLUE GUN SYSTEM

This application is a continuation of U.S. patent application Ser. No. 08/377,842, entitled "*Glue Gun System With Removable Cartridges*," and filed Jan. 25, 1995 now U.S. Pat. No. 5,664,701.

TECHNICAL FIELD OF THE INVENTION

The present invention relates to a multi-purpose glue gun system having removable cartridges and a heated stand. Specifically, the system allows the glue gun to accept different sizes and colors of glue sticks without spoiling the interior chamber of the gun with remnants of glue from an earlier use. Moreover, the system allows the cartridges to be held in a heating stand so each is ready for immediate use.

BACKGROUND OF THE INVENTION

Glue guns are used in the manufacture of textile products. A glue gun typically accepts a solid glue insert and melts one end of the insert. The melted glue can be controllably discharged from one end of the glue gun through a tip. The glue gun also has a handle to facilitate its handling by an operator. While glue is typically clear, certain textiles are manufactured using colored glues. This poses a problem when switching between different glue sticks. For example, if the user has applied a blue colored glue and then wants to switch to a yellow glue, the residual of blue glue left in the glue gun will initially spoil the color of the yellow glue exiting the tip. One solution to these problem is to have several glue guns, one devoted to each color glue to be dispensed. A second solution involves dispensing the second color of glue onto a waste sheet until the residual first glue has passed. Both solutions are wasteful, expensive and inadequate.

Standard glue guns demonstrate several other problems. For instance, a significant delay occurs after a second glue stick is inserted until it melts. Also, glue guns are typically structured to only accept one diameter of glue stick. Glue socks can come in various diameters and lengths. Also, the tips of the glue guns are rarely more than an orifice through which the glue flows. If the user wants to shape the glue or press it into a seam, the tip is invariably fouled. Another problem with existing glue guns relates to the heating units. Once a heating unit burns out the gun is inoperative.

A need exists for a glue gun which can accept variably sized glue sticks including extra long sticks. Such a glue gun should also be able to accept glue sticks of various colors without the risk of residual glue spoiling the next color. Further, a need exists for a glue gun with a tip designed to manipulate the glue after it has been dispensed. Also, a need exists for a glue gun which has an interchangeable heating element. When one heating element burns out, another can be inserted. Last, a need exists for a way of keeping the soon to be used glue sticks in a state virtually ready for use, thus minimizing any down time while the glue stick is heated.

SUMMARY OF THE INVENTION

The present glue gun system is a flexible system capable of handling glue sticks of various colors, diameters and lengths. The glue gun system includes a gun having a barrel. A cartridge can be removably placed in the barrel. The cartridge has an open central passage to accept a glue stick and a tip to dispense the glue. Once received into the barrel the cartridge is heated, melting the glue therein. Additional cartridges can be maintained in a heated state by a heating stand. Thus, after one glue stick cartridge is used, a second can be immediately installed and used. An insulated tab allows for the easy handling of the cartridges. The cartridges can be sized to accept smaller diameter glue sticks. Likewise, a standard cartridge can be downsized with an insertable adapter. An extended length holder can also be attached to the gun to feed an extended length of glue stick. The ability to replace cartridges allows the glue gun to accept glue sticks of various colors without the risk of residual glue spoiling the color of the next glue stick.

The cartridges can have specialized tips designed to manipulate the glue after it has been dispensed. The heating elements can be placed in either the cartridges or the gun itself. In the former case, the cartridges acts as an interchangeable heating element. When the heating element of one cartridge burns out, another cartridge having a functional heating element can be inserted into the barrel.

BRIEF DESCRIPTION OF THE DRAWINGS

For a more complete understanding of the present invention, and for further details and advantages thereof, reference is now made to the following Detailed Description taken in conjunction with th accompanying drawings, in which.

DETAILED DESCRIPTION OF THE DRAWINGS

Figure 1:
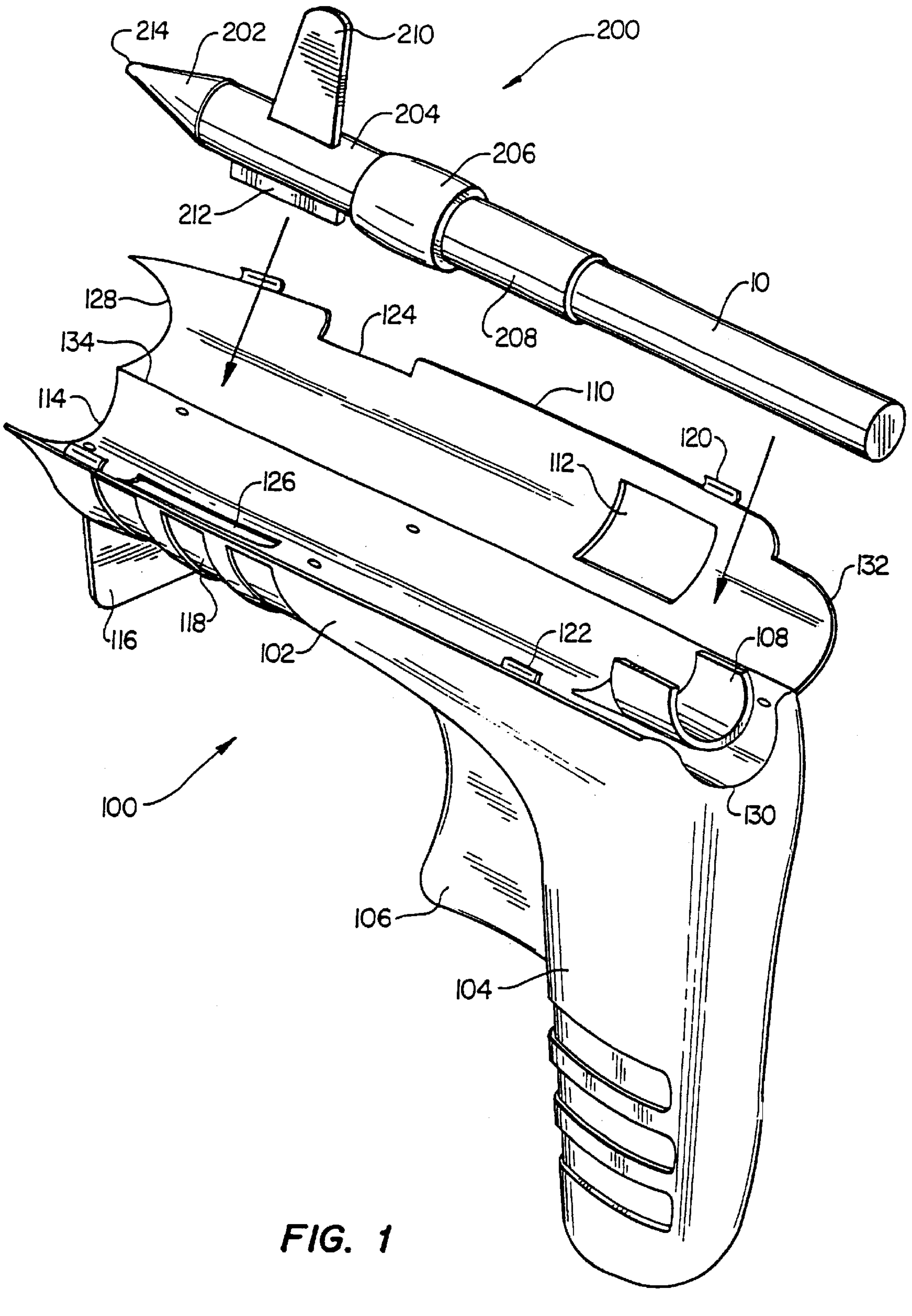
FIG. 1 is a perspective view of a glue gun embodying the present invention accepting a glue stick in a cartridge.

The present glue gun system overcomes many of the disadvantages found in the prior art. Referring to FIG. 1, a glue gun 100 is illustrated which embodies the present invention. The gun 100 has a barrel 102 connected to a handle 104. A trigger 106 is pivotally attached to the handle 104 such that compression of the trigger 106 advances a gripper 108. A stand 116 on the bottom surface of the barrel 102 allows the gun 100 to rest in a stable position. The barrel 102 is generally hollow and accessible by opening an upper lid 110. The lid 110 pivots along hinge 134. Once closed, the lid 110 is secured by placing the clasp 120 over the lip 122. The barrel 102 has a front opening defined by surfaces 114 and 128. Likewise, the barrel 102 has a rear opening defined by surfaces 130 and 132.

A cartridge 200 can be received into the opened barrel 102. THE cartridge has a tip 202 with a front orifice 214. The tip 202 of the cartridge 200 extends beyond the surfaces 114 and 128. The cartridge 200 also comprises a generally cylindrical hollow body 204 with an enlarged diameter portion 206. The enlarged diameter portion 206 can closely match the inner diameter of the barrel 102. A conductor 212 attached to the cartridge body 204 is inserted into slot 126 within the barrel 102. The conductor 212 can serve two functions. In one embodiment, a heating element 118 is contained within the 102 barrel. Heat is generated by a resistive heating element 118 as is well known in the art. In the first embodiment, heat from the heating element 118 is conducted to the cartridge 200 by conductor 212. In a second embodiment, an electrical connection is provided in the barrel 102 in place of the heating element 118. In the second embodiment, the resistive heating element 118 is contained within the cartridge 200. When the conductor 212 is inserted into the slot 126, current is provided to the cartridge 200 allowing it to heat. In either embodiment, an insulated tab 210 is provided for the user to grasp when withdrawing the cartridge 200 from the barrel 102.

The cartridge 200 also contains a sleeve 208. A glue stick 10 is inserted into the sleeve 208 and advanced into the cartridge body 204 where it is rendered into a viscous fluid state by heating. The stick 10 is advanced into the sleeve 208 by gripper 108 when the trigger 106 is compressed. Advancing the glue stick 10 into the sleeve 208 forces the melted glue in the cartridge body 204 to exit through the tip 202 and orifice 214. The gripper 108 can advance the glue stick 10 to the sleeve 208. Once the end of the glue stick 10 has entered the sleeve 208, another glue stick must be loaded.

If the second glue stick is a different color than the first, a second cartridge can be used. The first cartridge 200 prevented any melted glue from spoiling the inside of the barrel 102. Therefore, a second cartridge containing a second glue stick can be easily inserted into the clean interior of the barrel. The second cartridge will perform in the same fashion as the first. Likewise, the second glue stick will be advanced in the same fashion.

Figure 2:
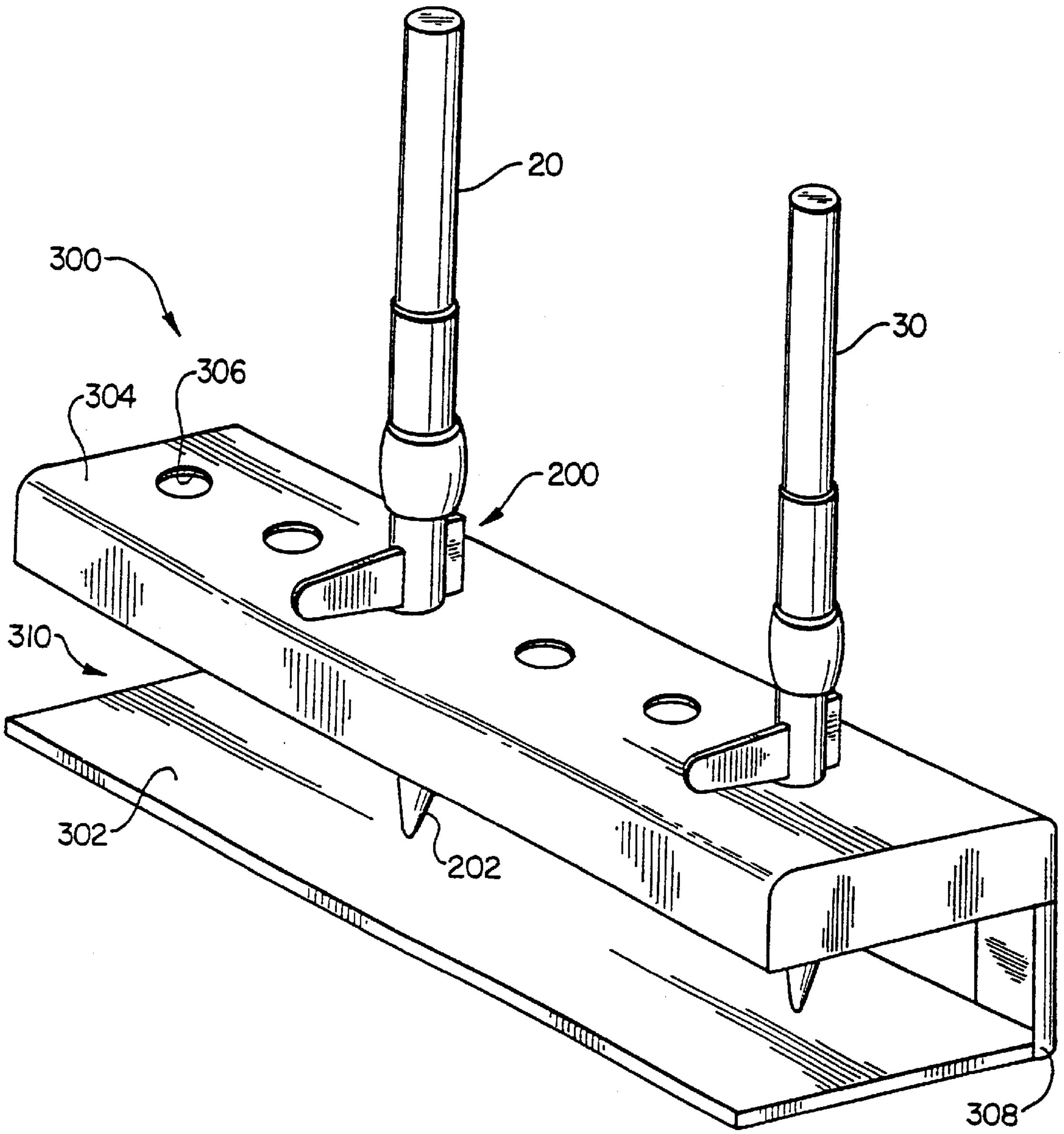
FIG. 2 is a perspective view of a first heating stand to accept unused cartridges, thereby keeping them heated for use.

Additional cartridges with glue sticks 20 and 30 can be kept in a heating stand 300, shown in FIG. 2. The stand has a base 302 and a heating portion 304 connected by posts 308. The heating portion 304 can be spaced from the base 302 by a gap 310. The heating portion 304 has a plurality of openings 306 for accepting the cartridges. Once inserted the cartridges are heated, keeping the glue in the cartridge body 204 in a liquid state. The glue tends not to drip from the tip because the glue stick is not advanced into the cartridge. However, for certain applications, a work piece can be placed in the gap 310. If a glue stick 20 is pushed into the cartridge 200, glue will exit tip onto the work piece. As described earlier, the resistive heating element can be within the heated portion 304 and the heat conducted to the cartridge. Alternatively, a heating element can be placed within the cartridge 200. In this embodiment, current is conducted into the cartridge by the leads within the opening 306. In either case, the cartridge 200 and glue is kept in a heated state to minimize any down time experienced when switching between glue sticks.

Figure 3:
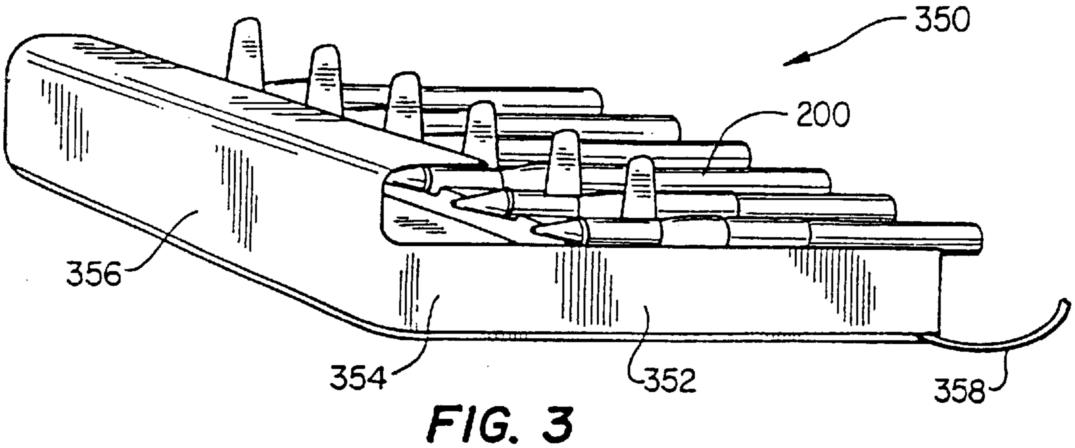
FIG. 3 is a perspective view of a second heating stand.

FIG. 3 illustrates a second style of heating stand 350. The stand 350 has a base 352 which sets on a surface. A tray 354 has a plurality of grooves for accepting cartridges such as cartridge 200. Once set in the groves, the cartridges are heated by a heating element in the base 352. Alternatively, the heating elements can be placed in the cartridges. In this case, a cartridge engages leads in the grooves which connect the heating element in the cartridge to a source of electricity. In either case, electricity can be supplied to the unit by cord 358. Energy can be supplied by any appropriate source. A heat shield 356 protects the user from the heated cartridges.

Figure 4A:
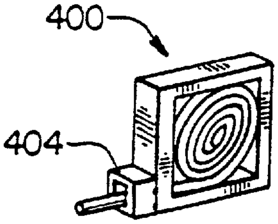
FIG. 4 is an extended length glue stick cartridge which contains a spiral wrapped length of glue and an adapter, and FIGS. **5*a* to 5*d*** illustrate various cartridges having specialized tips.
Figure 4B:
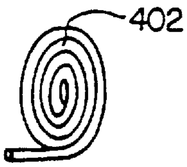
Figure 4C:
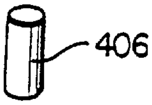

The glue gun system can also accept an extended length glue stick cartridge 400, shown in FIG. 4. Most glue sticks are a relatively short, six to eight inches in length. The cartridge 400 can hold a spiral of solid, yet flexible, glue 402 of lengths around six feet. The glue stick 402 can be provided with a suitable cross section to allow it to more easily be stored in a spiral. A forward tab 404 of the cartridge 400 is accepted between rear surfaces 130 and 132. The glue stick 402 is advanced by grippers 108. The system can also be modified to accept smaller diameter sticks using adapter 406. The adapter 406 can have a reduced diameter central passage for accepting the smaller diameter glue sticks.

Figure 5A:
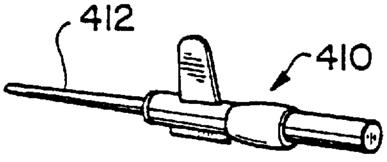
Figure 5B:
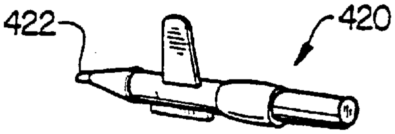
Figure 5C:
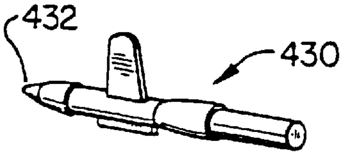
Figure 5D:
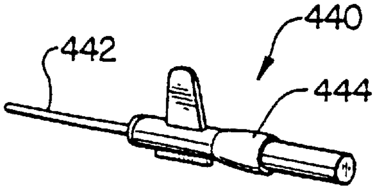

The glue gun system also allows for a number of cartridges having specialized tips. FIG. 5*a* illustrates a cartridge 410 having an extended narrow tip 412 which can dispense glue in hard to reach places. FIG. 5*b* illustrates a cartridge 420 having a flattened tip 422, thereby allowing the user to flatten the glue from a thin bead into a flat bed. FIG. 5*c* illustrates a cartridge 430 illustrates a glue gun cartridge 430 suitable for use with a stick of caulk, rather than glue. Caulk sticks perform in the same way as glue sticks, but require a bigger orifice 432 to properly flow. FIG. 5*d* illustrates a specialized cartridge that allows the glue gun system to double as a soldering gun. The soldering tip cartridge 440 has an extended tip 442, but no internal passage to accept a glue stick. The cartridge body 444 simply accepts heat from the heating element and transmits that to the tip 442. With any of the cartridges described above, the heating element can be resident in the cartridge or in the barrel.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A removable cartridge for use in a glue gun, said removable cartridge comprising:

a cartridge body having a central passage extending therethrough for accepting a stick of a glue, said cartridge body having an exterior portion which is of a size and shape to closely match a portion of the glue gun for removably securing said cartridge body to a body of the glue gun;

heating means mounted to said cartridge body for releasably coupling to the glue gun and heating a portion of the glue which is within said central passage of said cartridge body; and a dispensing tip having an orifice, said dispensing tip secured to said cartridge body for receiving the glue from the central passage of said cartridge body and dispensing the glue therefrom.

2. The removable cartridge according to claim 1, wherein said heating means comprises a thermal conductor which extends from said cartridge body and which is adapted for engaging within a heated recess of the glue gun to transfer heat from the heated recess of the glue gun to said cartridge body, and to removably secure the cartridge body to the glue gun.

3. The removable cartridge according to claim 1, wherein said heating means comprises a resistive heater, and said removable cartridge further comprises a releaseable interface for electrically connecting said resistive heater to the glue gun body for powering said resistive heater, and wherein said releaseable interface is interrupted from electrically connecting said resistive heater to the glue gun by the action of removing said removable cartridge from the glue gun body.

4. The removable cartridge according to claim 1, further comprising an insulated tab mounted to said cartridge body and extending therefrom in a direction which is transverse to said central passage of said cartridge body.

5. The removable cartridge according to claim 1, further comprising a sleeve mounted to said cartridge body and extending rearwardly therefrom, said sleeve defining at least a rearward part of said central passage.

6. The removable cartridge according to claim 1, further comprising a removable adapter for securing interiorly within said central passage of said cartridge body, said removable adapter having a reduced diameter central bore being sized for receiving a second glue stick which is smaller than said stick of glue which is received into said central passage.

7. The removable cartridge according to claim 1, wherein said orifice of said dispensing tip is smaller than said central passage of said cartridge body.

8. A removable cartridge adapted for use in a glue gun, wherein the glue gun is of the type having a barrel and a grip secured to the barrel, the removable cartridge comprising:

a cartridge body having an enlarged diameter portion which closely matches an inner diameter of the barrel of the glue gun for removably securing the cartridge body within the barrel of the glue gun, said cartridge body having forward and rearward ends with a central passage extending therebetween which is of a size for accepting a stick of a glue;

a heating member mounted to said cartridge body for releasably coupling to the barrel of the glue gun and heating a portion of the glue which is disposed within said central passage of said cartridge body; and a dispensing tip secured to said forward end of said cartridge body for receiving a melted portion of the glue from said central passage, said dispensing tip having an orifice for dispensing the glue from within said central passage.

9. The removable cartridge according to claim 8, wherein the heating member comprises:

a resistive heating element mounted to said cartridge body for heating the portion of the glue disposed within said cartridge body; and a conductor extending from said resistive heating element for releasably connecting to an electrical connection disposed within the barrel of the gun.

10. The removable cartridge according to claim 9, wherein said resistive heating element is contained within said cartridge.

11. The removable cartridge according to claim 9, further comprising an insulated tab mounted to said cartridge body and extending therefrom in a direction which is transverse to said central passage of said cartridge body.

12. The removable cartridge according to claim 9, further comprising a sleeve mounted to said rearward end of said cartridge body and extending rearwardly therefrom, said sleeve defining at least part of said central passage.

13. The removable cartridge according to claim 9, further comprising:

an insulated tab mounted to said cartridge body and extending therefrom in a direction which is transverse to said central passage of said cartridge body; and a sleeve mounted to said rearward end of said cartridge body and extending rearwardly therefrom, said sleeve defining at least part of said central passage.

14. The removable cartridge according to claim 8, further comprising an adapter for securing interiorly within said central passage of said cartridge body, said adapter having a reduced diameter central bore for receiving a glue stick of a smaller size than the stick of glue which is received into said central passage.

15. The removable cartridge according to claim 8, further comprising an extended length glue stick cartridge having an interior cavity for receiving the stick of glue, wherein the stick of glue is formed into a spiral.

16. The removable cartridge according to claim 15, wherein said extended length glue stick cartridge includes a forward tab for receiving within the glue gun, with a forward end of said stick of glue being spaced apart from said central body portion.

17. The removable cartridge according to claim 16, further comprising:

an insulated tab mounted to said cartridge body and extending therefrom in a direction which is transverse to said central passage of said cartridge body; and a sleeve mounted to said cartridge body and extending therefrom, said sleeve defining at least part of said central passage.

18. A method for dispensing hot glue from a glue gun, the method comprising the steps of:

providing a glue gun, and a first and a second cartridges, wherein the first and second cartridges are separately and removably securable to the glue gun and have a first and second dispensing orifices, respectively;

inserting a first glue stick into the first cartridge;

inserting a second glue stick into the second cartridge;

removably securing the first cartridge to the glue gun;

heating a first portion of the first glue stick;

passing the heated first portion of the first glue stick through the first orifice, and from within the first cartridge and the glue gun;

removing the first cartridge from the glue gun with a second portion of the first glue stick remaining within the first cartridge;

removably securing the second cartridge to the glue gun;

heating a first part of the second glue stick;

passing the heated first part of the second glue stick from within the second cartridge, directly through the second orifice and from the glue gun; and then, removing the second cartridge from the glue gun with a second part of the second glue stick remaining within the second cartridge.

19. The method according to claim 18, further comprising the steps of:

providing the first and second cartridges with a first and a second resistive heating elements, respectively;

wherein the step of removably securing the first cartridge to the glue gun comprises electrically connecting to the glue gun the first resistive heating element included with the first cartridge; and wherein the step of heating the first portion of glue within the first cartridge comprises passing electric current through the first resistive heating element included with the first cartridge.

20. The method according to claim 19, further comprising the steps of:

providing a cartridge stand;

disposing one of the first and second cartridges on the cartridge stand, with the first and second glue sticks disposed within respective ones of the first and second cartridges; and then, preheating the one of the first and second cartridges disposed on the cartridge stand to partially melt a respective portion of the first and second glue sticks.

21. The method according to claim 20, wherein:

the step of disposing the one of the first and second cartridges on the cartridge stand comprises electrically connecting to the cartridge stand a respective one of the first and the second resistive heating elements included in the one of the first and second cartridges disposed on the cartridge stand; and the step of preheating the one of the first and second cartridges to partially melt the respective portion of the first and second glue sticks comprises passing electric current through the one of the first and second cartridges disposed on the cartridge stand.

* * * * *